(12) United States Patent
Wittenberg et al.

(10) Patent No.: US 7,416,126 B2
(45) Date of Patent: Aug. 26, 2008

(54) TAUT, TORSIONAL FLEXURE AND A COMPACT DRIVE FOR, AND METHOD OF, SCANNING LIGHT USING THE FLEXURE

(75) Inventors: Carl Wittenberg, Water Mill, NY (US); Peter Everett Brooks, Rochester, MN (US)

(73) Assignee: Symbol Technologies, Inc., Hortsville, NY (US)

( * ) Notice: Subject to any disclaimer, the term of this patent is extended or adjusted under 35 U.S.C. 154(b) by 432 days.

(21) Appl. No.: 11/165,738

(22) Filed: Jun. 24, 2005

(65) Prior Publication Data

US 2006/0289653 A1 Dec. 28, 2006

(51) Int. Cl.
*G06K 7/10* (2006.01)
(52) U.S. Cl. .................... 235/462.36; 235/462.49; 235/375; 235/379; 347/40; 362/352
(58) Field of Classification Search .......... 235/462.36, 235/379, 462.49, 375; 347/40; 362/352
See application file for complete search history.

(56) References Cited

U.S. PATENT DOCUMENTS

| 4,622,456 | A | * | 11/1986 | Naruto et al. ............... 235/379 |
| 6,142,379 | A | * | 11/2000 | Bard et al. ............. 235/472.01 |
| 6,390,370 | B1 | * | 5/2002 | Plesko .................... 235/462.49 |
| 6,626,355 | B2 | * | 9/2003 | Sasse et al. ................. 235/375 |
| 7,237,340 | B2 | * | 7/2007 | Johnson et al. ............... 30/162 |
| 2003/0165062 | A1 | * | 9/2003 | Humphrey et al. .......... 362/352 |
| 2005/0038424 | A1 | * | 2/2005 | Okada .......................... 606/47 |
| 2007/0222818 | A1 | * | 9/2007 | Silverbrook ................. 347/40 |

\* cited by examiner

*Primary Examiner*—Michael G. Lee
*Assistant Examiner*—Allyson N. Trail
(74) *Attorney, Agent, or Firm*—Kirschstein, et al.

(57) ABSTRACT

A taut, torsional flexure is used in a compact drive for scanning light and is of beneficial use in a lightweight, compact image projection module, especially for mounting in a housing having a light-transmissive window, the module being operative for causing selected pixels in a raster pattern to be illuminated to produce an image of high resolution of VGA quality in color.

20 Claims, 8 Drawing Sheets

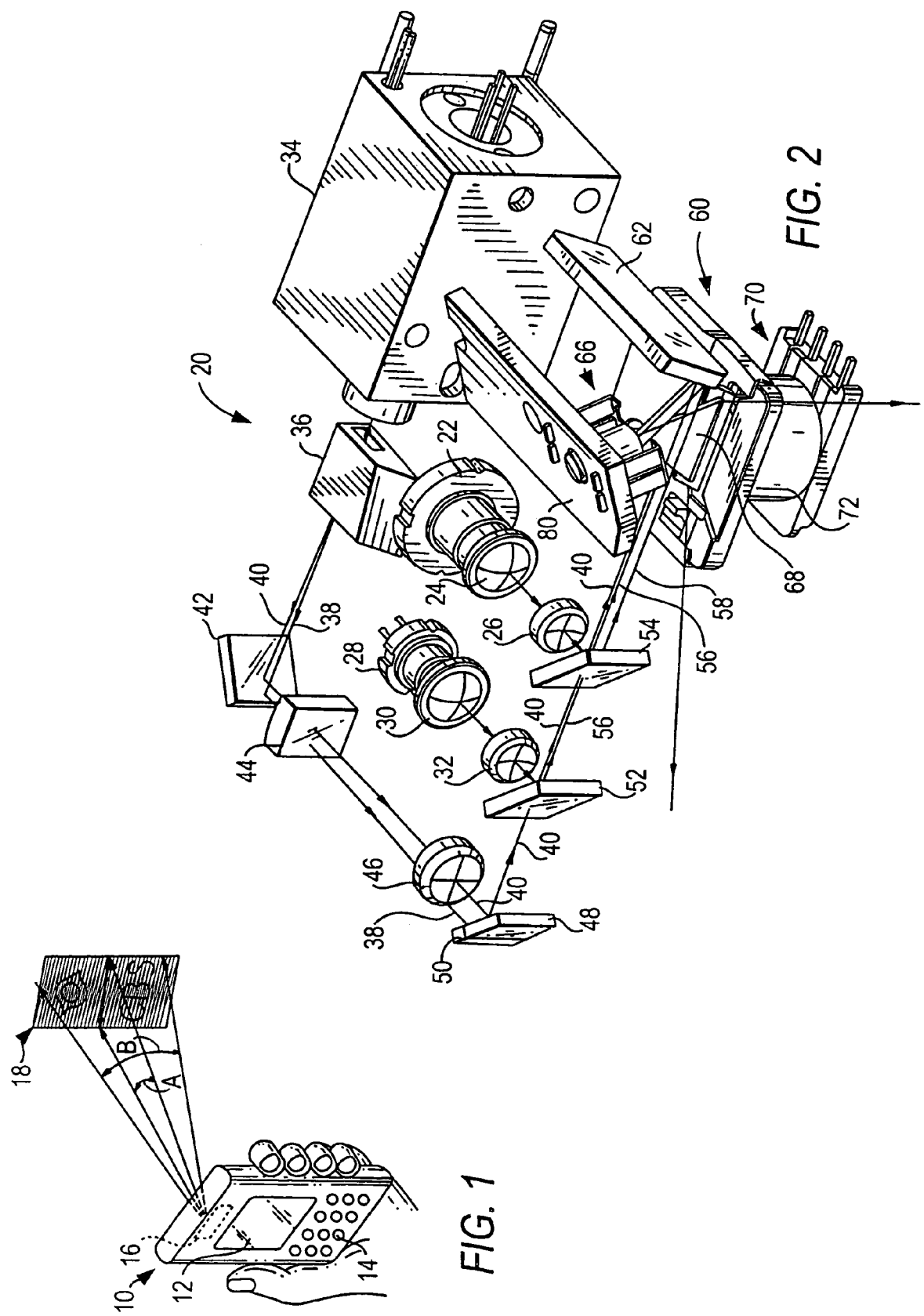

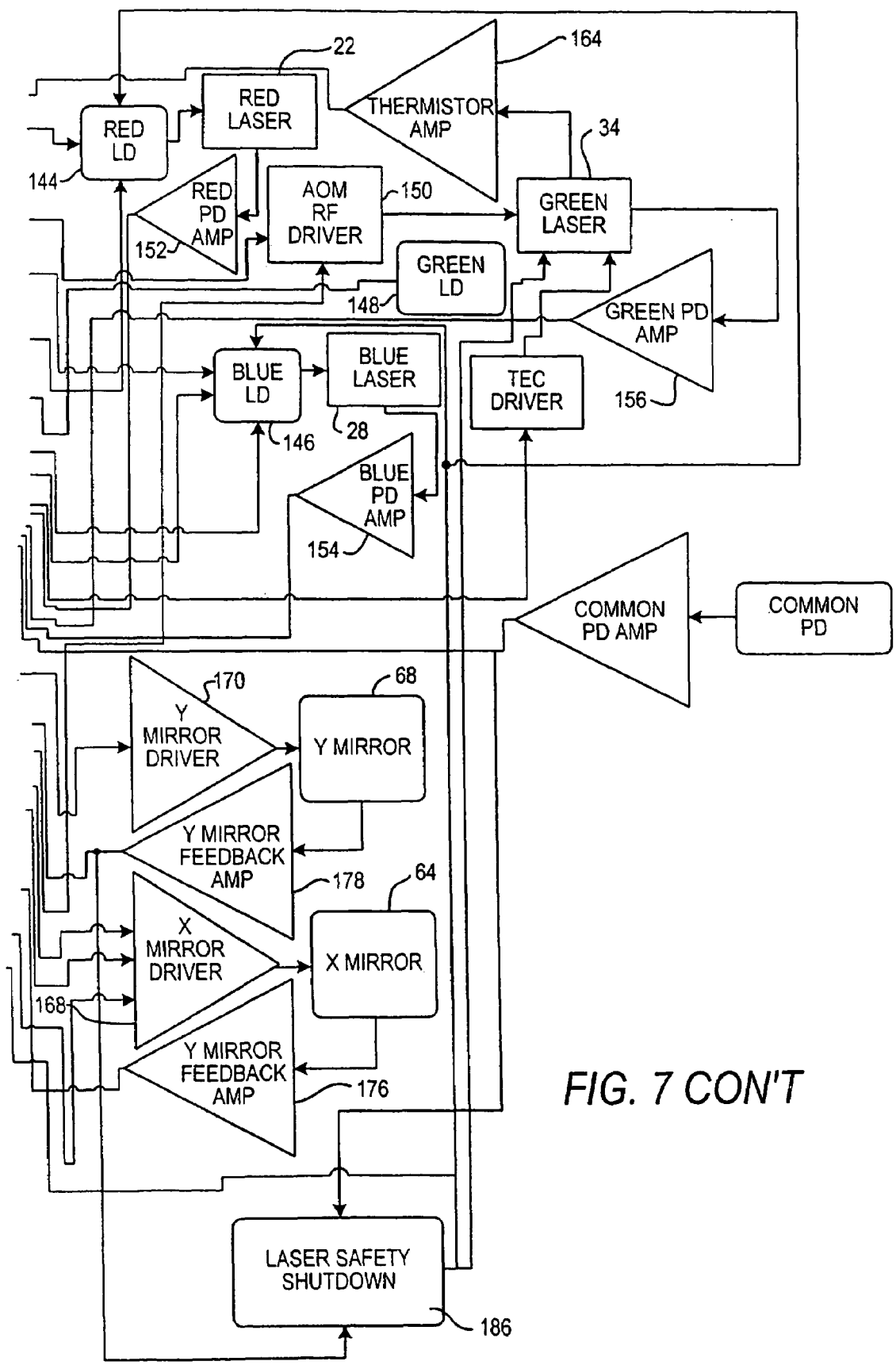
FIG. 7 CON'T

TAUT, TORSIONAL FLEXURE AND A COMPACT DRIVE FOR, AND METHOD OF, SCANNING LIGHT USING THE FLEXURE

BACKGROUND OF THE INVENTION

1. Field of the Invention

The present invention generally relates to a taut, torsional flexure and a compact drive for, and a method of, scanning light using the flexure, especially for use in a color image projection arrangement operative for projecting a two-dimensional image in color while maintaining low power consumption, high resolution, miniature compact size, quiet operation and minimal vibration.

2. Description of the Related Art

It is generally known to project a two-dimensional image on a screen based on a pair of scan mirrors which oscillate by respective drives in mutually orthogonal directions to scan a laser beam over a raster pattern. However, the known image projection arrangements project the image with limited resolution, typically less than a fourth of video-graphics-array (VGA) quality of 640×480 pixels, consume a relatively large amount of electrical power, and are relatively heavy in weight and occupy a relatively large volume, thereby rendering them impractical for use in miniature, hand-held, battery-operated applications.

For example, the drive for one of the scan mirrors includes a permanent magnet jointly movable with the mirror. The magnet and the mirror are mounted on a flexure that permits oscillation about an axis. An electromagnetic coil is energized by a periodic drive signal and generates an electromagnetic field which interacts with the permanent field of the magnet to flex the flexure and cause the magnet and, in turn, the scan mirror to oscillate about the axis.

Although generally satisfactory for its intended purpose, the above-described electromagnetic drive is not ideal for miniature, hand-held, battery-operated applications. For example, the flexure must be tensioned to a taut state to better withstand ambient temperature changes and to produce repeatable oscillations. Such tensioning is provided by additional discrete components, such as clamps, pins and screws, all of which increase the weight, volume and energy expenditure of the drive. In addition, the assembly of these additional components increases the cost and complexity of manufacture of the drive, as well as increasing the likelihood that one or more of these additional components will become loose or fail, thereby compromising the tension on the flexure and eventually leading to unreliable, unrepeatable, temperature-dependent scanning. A laser beam, for example, incident on the mirror supported by such a compromised flexure will not be accurately directed to its intended pixel of the image and, as a result, the resolution of the projected image is degraded.

SUMMARY OF THE INVENTION

Objects of the Invention

Accordingly, it is a general object of this invention to provide a taut, torsional flexure for use in a compact drive for scanning light, especially for use in an image projection arrangement that projects a sharp and clear, two-dimensional color image over an extended range of distances away from the arrangement.

Another object of this invention is to minimize the weight, volume, complexity and energy expenditure of such drives.

Still another object of this invention is to simplify the tensioning of such flexures.

Yet another object of this invention is to provide reliable, repeatable, temperature-independent light scanning for image projection arrangements.

An additional object is to provide a miniature, compact, lightweight, energy-efficient, and portable color image projection arrangement useful in many instruments of different form factors, especially hand-held instruments.

Features of the Invention

In keeping with these objects and others which will become apparent hereinafter, one feature of this invention resides, briefly stated, in a drive for, and a method of, scanning light. A flexure is mounted on a support. The flexure has a pair of torsion portions extending along an axis. A light-reflecting scan mirror is mounted on the flexure for joint movement therewith. The flexure is flexed in opposite circumferential directions about the axis for oscillating the scan mirror about the axis.

In accordance with this invention, means are provided that are integral with the flexure itself for tensioning the flexure along the axis to a taut state in which the flexure is flexed. No additional discrete components, such as clamps, pins and screws, are employed to achieve a taut flexure. There are no additional components to order, inventory, assemble, fail or lose. The drive is more compact than heretofore, and is lower in weight, volume and energy consumption since there is less of a mass to oscillate. The tensioning achieved herein is repeatable, reliable and is resistant to ambient temperature variations. A light beam incident on the scan mirror is accurately reflected to its target, for example, a pixel of an image to be projected by an image projection arrangement in which such a compact drive is useful.

In another application, the light beam is not used for image projection, but instead, is used to sweep the light beam across machine-readable indicia, such as a one- or two-dimensional bar code symbol. In still another application, the light beam is not swept, but instead, a field of view of a light detector is swept across the symbol, and light scattered by the symbol is reflected by an oscillating mirror and directed to the detector.

In the preferred embodiment, the flexure is flexed by magnetic field interaction. A permanent magnet is mounted on the flexure, and an electromagnetic coil is mounted on the support. In response to a periodic drive signal applied to the coil, a periodic electromagnetic field is produced which interacts with a permanent magnetic field of the magnet, thereby flexing the flexure and oscillating both the magnet and the scan mirror.

The magnet and the scan mirror are preferably mounted on a support portion of the flexure intermediate the torsion portions. The flexure has end portions spaced apart along the axis. One of the end portions is anchored to the support. The other of the end portions provides the means for tensioning the flexure. Preferably, a resilient flap is formed in the other end portion. This flap resiliently bears against the support and pushes the end portions axially away from one another to the taut state.

In operation, the magnet is oscillated by the magnetic field interaction described above. This causes the support portion of the flexure and the scan mirror to move in opposite circumferential directions, thereby first twisting the torsion portions in one circumferential direction, and then twisting the torsion portions in the opposite circumferential direction. The flexure is constantly tensioned by the flap during these twisting movements, thereby assuring that no erratic, unintended flexure movements occur. Vibration dampers can be used to attenuate undesired vibrations.

Use of the taut, torsional flexure in a compact drive is particularly beneficial in an image projection arrangement for projecting a two-dimensional, color image. The arrangement includes a support; a plurality of red, blue and green lasers for respectively emitting red, blue and green laser beams; an optical assembly for co-linearly arranging the laser beams to form a composite beam; a scanner for sweeping the composite beam as a pattern of scan lines in space at a working distance from the support, each scan line having a number of pixels; and a controller for causing selected pixels to be illuminated, and rendered visible, by the laser beams to produce the color image.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The other scan mirror is driven by the compact drive of this invention. The image resolution preferabley exceeds one-fourth of VGA quality, but typically equals or exceeds VGA quality. The support, lasers, scanner, controller and optical assembly preferably occupy a volume of less than thirty cubic centimeters.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement for installation in the instrument of FIG. 1;

DETAILED DESCRIPTION OF THE PREFERRED EMBODIMENTS

Figure 3:
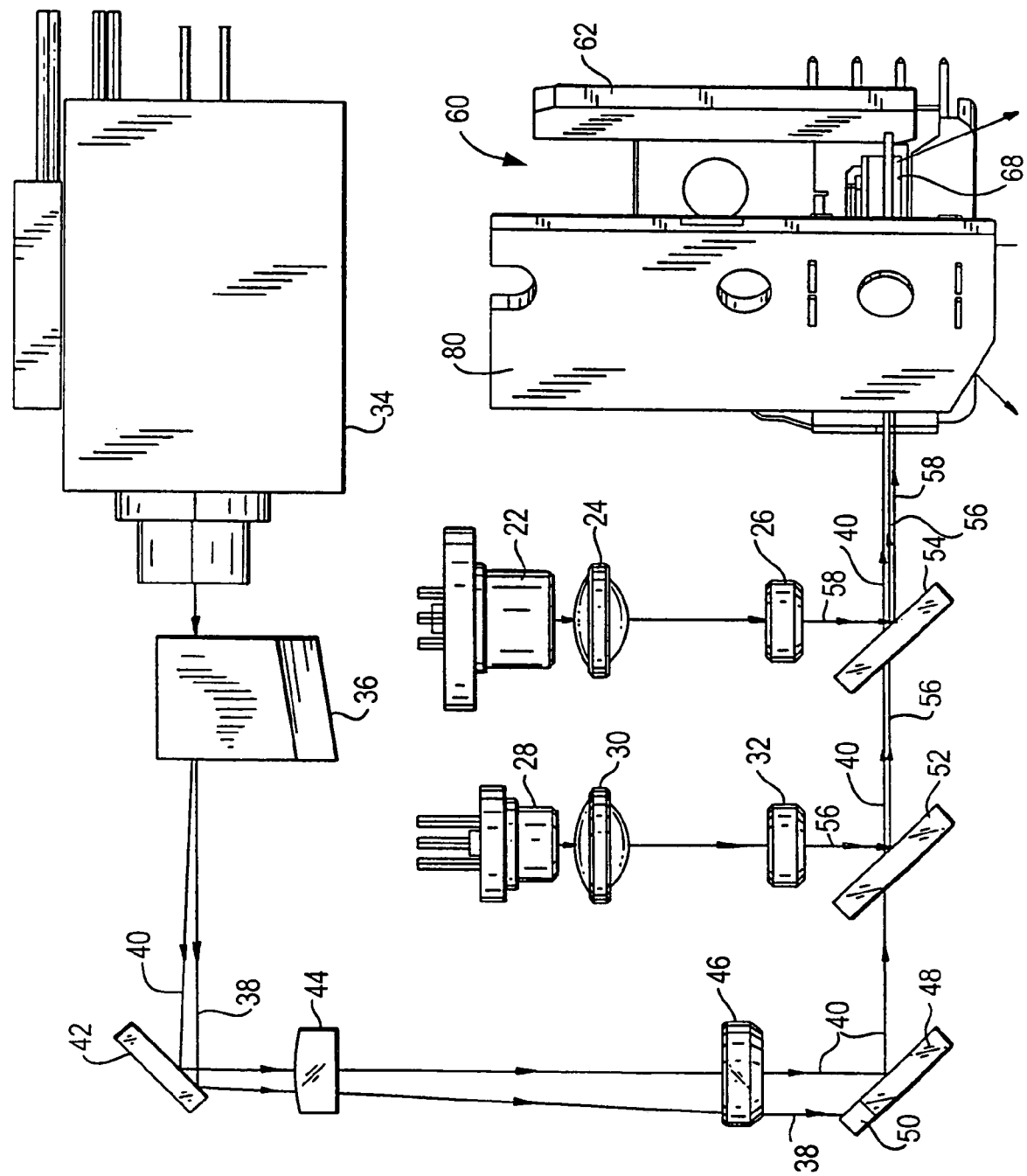
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between the two laser mirrors. Since the infrared laser power inside the cavity is much larger than the power coupled outside the cavity, the frequency doubler is more efficient in generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device such as a thermoelectric cooler relying on the Peltier effect is used to control the temperature of the green laser module. The thermoelectric cooler can either heat or cool the device depending on the polarity of the applied current. A thermistor is part of the green laser module in order to monitor its temperature. The readout from the thermistor is fed to the controller, which adjusts the control current to the thermoelectric cooler accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator (AOM) 36 which creates an acoustic standing wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used either externally or internally to the green laser module to pulse the green laser beam. Other possible ways to modulate the green laser beam include electro-absorption modulation, or Mach-Zender interferometer. The AOM is shown schematically in FIG. 2.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
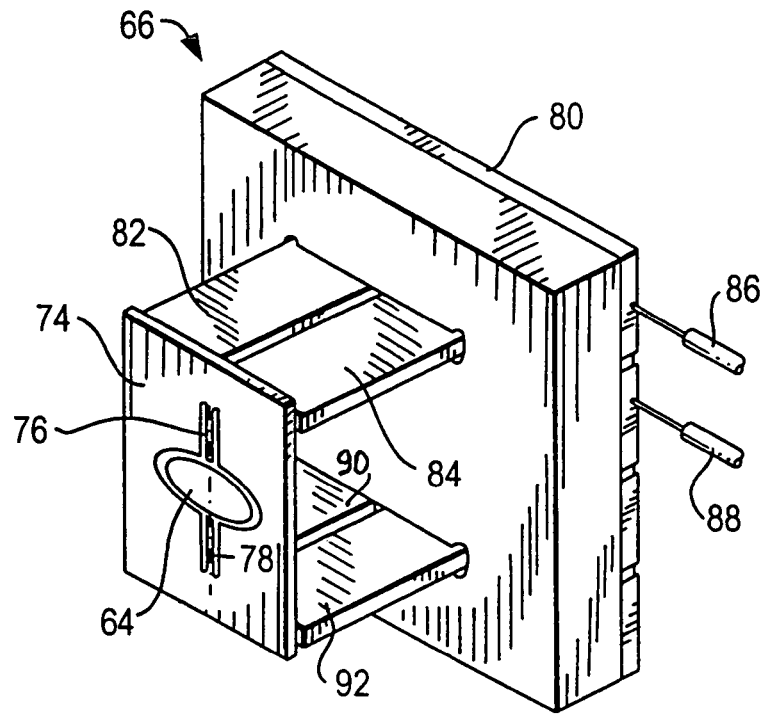
FIG. 4 is a perspective front view of an inertial drive for use in the arrangement of FIG. 2.
Figure 5:
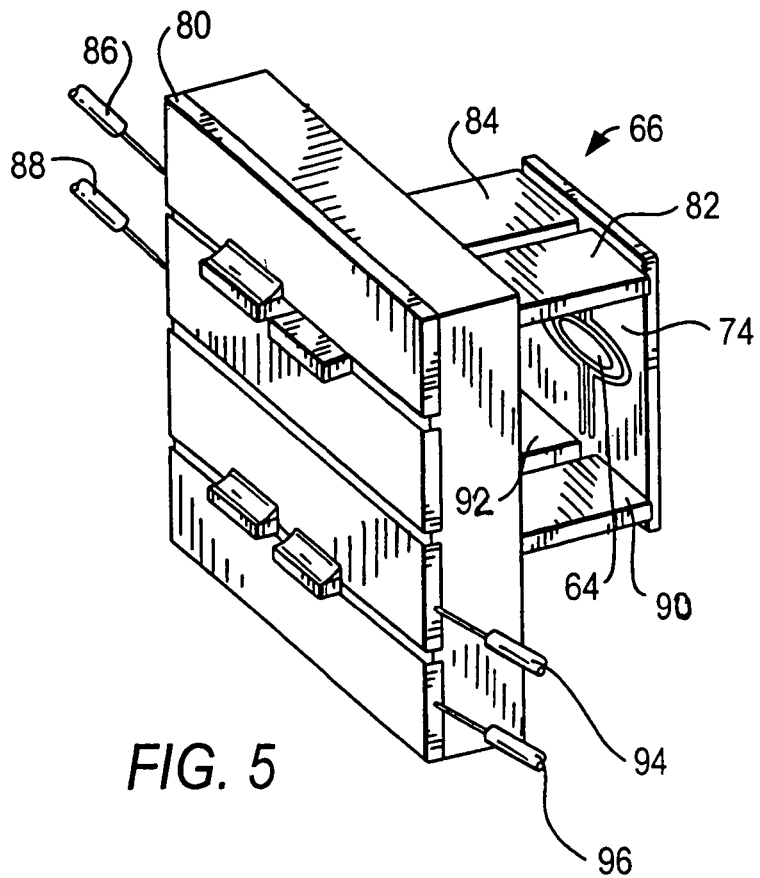
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150µ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749µ×1600µ. Each hinge portion measure 27µ in width and 1130µ in length. A The frame has a rectangular shape measuring 3100µ in width and 4600µ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150µ thick, and the scan mirror has a high Q factor. A movement on the order of 1µ by each transducer can cause oscillation of the scan mirror at scan rates in excess of 20 kHz.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 (shown in exploded view in FIG. 8 and in assembled view in FIG. 9) includes a permanent magnet 71 jointly mounted on a flexure 200 and behind the second scan mirror 68, and an electromagnetic coil 72 operative for generating a periodic magnetic field in response to receiving a periodic drive signal. The coil 72 is adjacent the magnet 71 so that the periodic field magnetically interacts with the permanent field of the magnet and causes the magnet and, in turn, the second scan mirror 68 to oscillate, as described in detail below.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range we can display high-definition television standard, denoted 720p, 1270×720 pixels. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
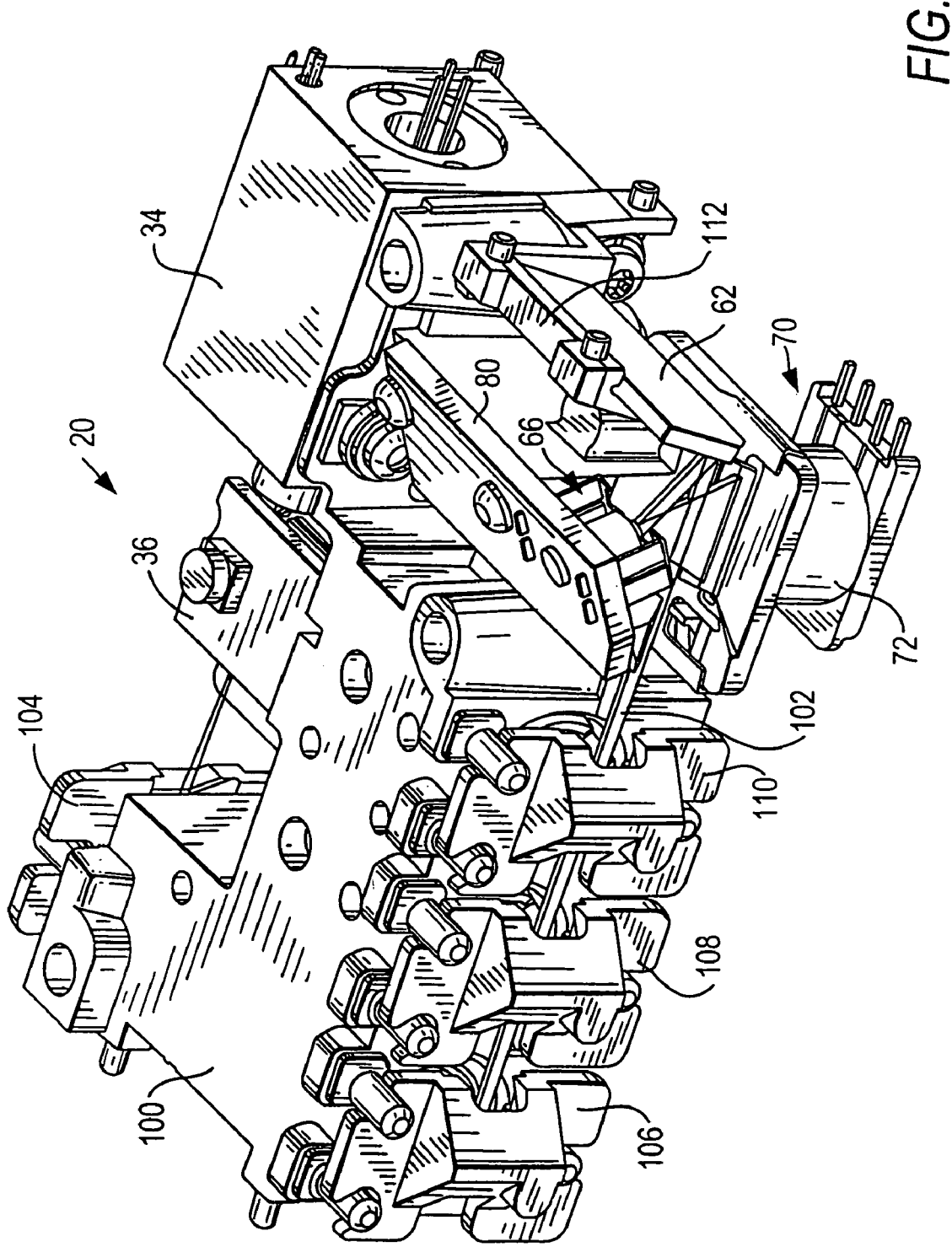
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective super-imposition of one or more of the red, blue, and green lasers.

The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
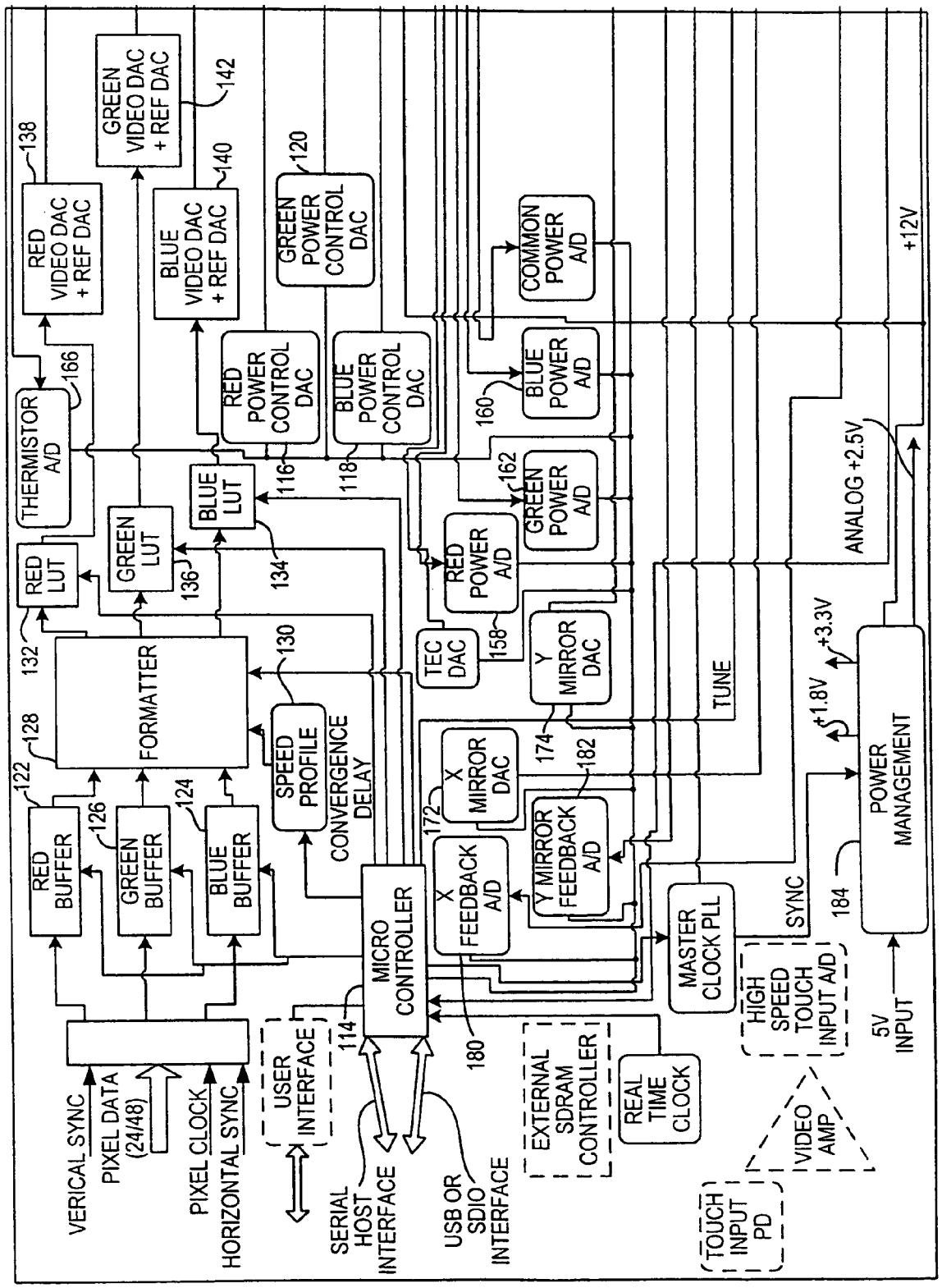
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to the AOM radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

Figure 8:
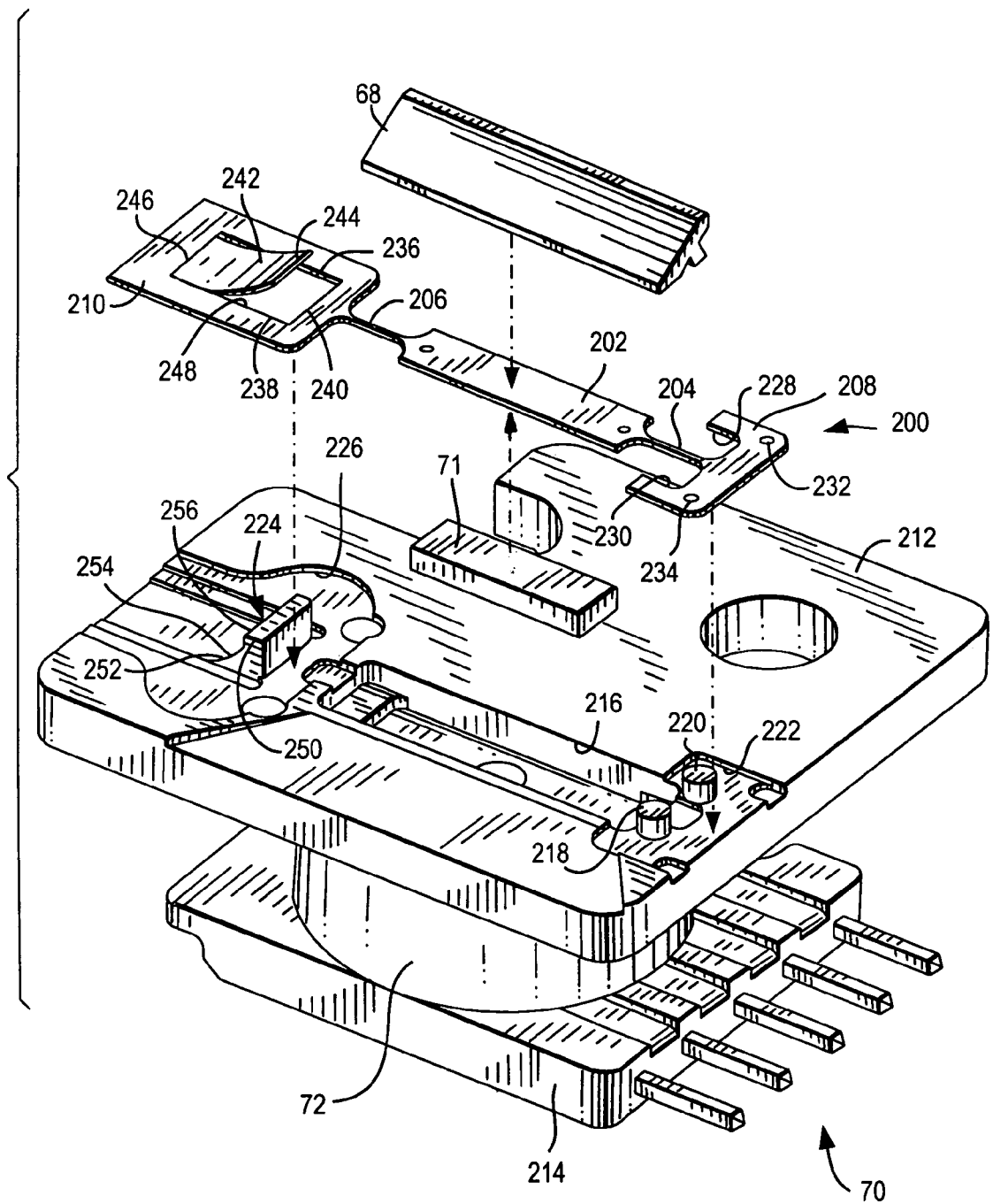
FIG. 8 is an exploded view of a compact drive in accordance with this invention as used in the arrangement of FIG. 6.
Figure 9:
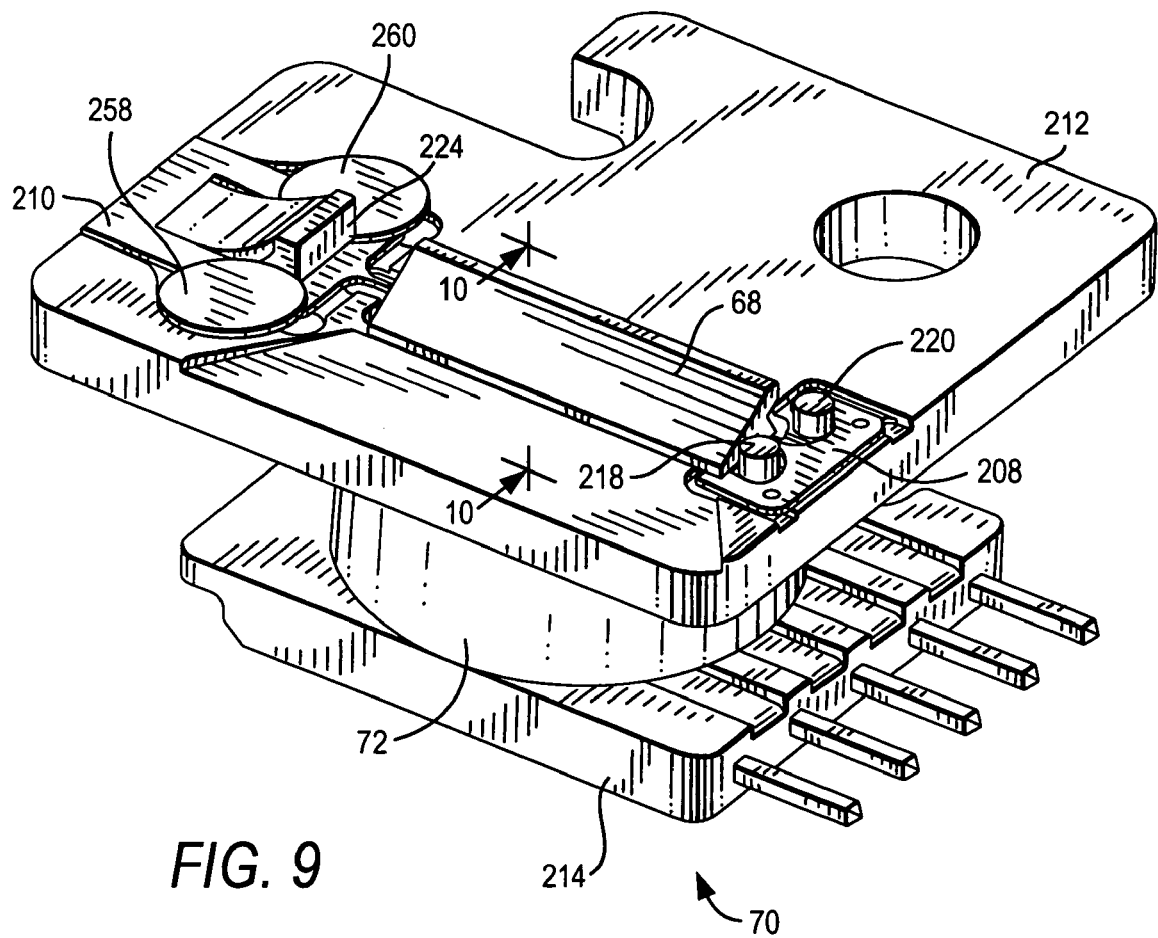
FIG. 9 is an assembled view of the drive of FIG. 8.

Turning now to the electromagnetic drive 70 of FIGS. 8-9, the above-described flexure 200 includes a planar support portion 202, a pair of planar co-linear torsion portions 204, 206, and a pair of planar end portions 208, 210. The flexure is a single elongated piece of resilient material, preferably a tempered stainless steel having a thickness on the order of 0.027 mm. The width of the torsion portions is on the order of 0.122 mm and, although it is possible to machine the flexure with such dimensions, it is preferable to chemically etch the flexure for this purpose. The torsion portions are thin, long, wire-like strands which behave as torsion bars, as described below.

The drive 70 includes a molded plastic support having an upper plate 212 and a lower plate 214 between which the coil 72 is sandwiched. The upper plate has an elongated recessed compartment 216 having a top opening, a pair of upright, cylindrical positioning pins 218, 220 mounted in a shallow generally rectangular recess 222, and an upright projection 224 mounted in another shallow recess 226.

The flexure 200 is mounted on the upper plate 212 and longitudinally spans the top opening of the compartment 216.

The magnet 71 is mounted on the bottom side of the support portion 202 and lies at least partly within the compartment 216, thereby positioning the magnet 71 closer to the coil than heretofore, and shortening the overall vertical height required for the drive.

The end region 208 is E-shaped and has a pair of cutouts 228, 230 for snugly receiving the pins 220, 218. Inlet holes 232, 234 permit the introduction of a liquid glue to securely anchor the end region 208 in the shallow recess 222.

The end region 210 is shaped as a rectangle and is interiorly formed with two longitudinal cuts 236, 238 and a transverse cut 240, thereby framing and creating a rectangular flap 242. The flap 242 lies in the same plane as the end region 210. For purposes of clarity of illustration, however, the flap 242 in FIG. 8 has been shown in its curved, compressed or buckled state, as described below, in order to better display its free edge 244 which is above the plane of the end region 210 in the taut state. The flap 242 is hinged to the end region 210 at its hinged edge 246 which is parallel to the free edge 244.

When the end region 210 is mounted on the upper plate 212, a top surface 250 of the aforementioned projection 224 engages the underside of the flap 242 adjacent the free edge 244 and pushes the flap to assume the illustrated curved shape. As the flap is bent, it vacates a rectangular cutout 248 in the end region 210. The projection 224 also has a curved surface 252 which is generally of complementary contour to the curvature of the bent flap 242. Actually, the curved surface 252 is designed to insure that the bent flap 242 is not bent past its yield point during assembly, even if the flexure is manually installed with the aid of a tool such as tweezers. In other words, it is not desired to impart a permanent bend to the flap since such a permanent deformation could rob the flap of providing the necessary tension to the flexure as described below. In addition, a limited clearance between the curved surface 252 and the curved flap 242 ensures that a permanent bend will not be imparted to the flap in case of a drop event, that is, where the arrangement experiences sudden shock and deceleration forces when it accidentally hits the ground or other hard surface.

Once the end region 210 is placed flat on the upper plate 212, as shown in the assembled view of FIG. 9, the free edge 244 is captured with a snap-type action in a corner 254 formed between an upright vertical surface 256 and the curved surface 252 of the projection 250. The projection 224 cooperates with the resilient flap 242 to apply tension lengthwise of the flexure, that is, the end region 210 is pushed away from the end region 208. This tension is achieved not by additional discrete components as in the prior art, but instead, by the flap which is integral with the flexure. It is the compression or buckling of the flap that creates a reaction force to tension the torsional portions of the flexure.

The tensioned flexure acts as a restoring spring for the scan mirror 68 mounted thereon. During energization of the coil 72 with a periodic drive signal, a periodic electromagnetic field is propagated which interacts with the permanent field of the magnet 71, thereby causing the magnet to oscillate in opposite circumferential directions along an axis along which the torsion portions 204, 206 extend. The oscillating magnet oscillates the support portion 202 and the scan mirror 68 and twists the torsion portions 204, 206 in one circumferential direction about the axis relative to the fixed end portions 208, 210 to an end-limiting scan position. Thereupon, the energy stored in the twisted torsion portions is released, thereby moving the support portion 202 and the scan mirror 68, as well as untwisting the torsion portions in the opposite circumferential direction about the axis relative to the fixed end portions 208, 210. This energy release may or may not be aided by the interacting magnetic fields. In any event, the movement of the support portion 202 and the scan mirror continues, and the torsion portions 204, 206 are twisted, this time along the opposite circumferential direction, to another end-limiting scan position. This cycle is repeated, thereby oscillating the scan mirror 68 and sweeping any light beam incident on the scan mirror 68 between the end-limiting scan positions. By ensuring that the flexure is tensioned, the scanning movement of the mirror is repeatable, reliable and immune to ambient temperature variations which cause expansion and contraction of the metal flexure.

A pair of vibration dampers 258, 260 is adhered on the end region 210 and the upper plate 212. The dampers serve as visco-elastic dampers designed to attenuate any vibrations in a certain frequency range. The dampers also serve as an additional mechanical anchorage for the end region 210 to resist the flexure becoming dislodged from the projection 224 during a drop event.

As previously noted, the compact drive of this invention is used in a preferred embodiment as the vertical or Y-drive in creating the raster pattern. That means that the light beam incident on the scan mirror is a scan line whose length extends along the horizontal or X-direction of the raster pattern. To accommodate the entire length of the scan line, the scan mirror 68, as shown in FIGS. 8-9, is long in length and short in height. A long scan mirror, however, increases the overall length of the drive and, hence, to decrease the overall length and thereby achieve a compact construction, the scan mirror is designed to at least partially overlap the torsion portions 204, 206. To this end, as shown in FIG. 10, the rear of the scan mirror 68 has a longitudinal recess 262 so that the torsion portions 204, 206 do not contact the scan mirror-at its overlapping region.

Figure 10:
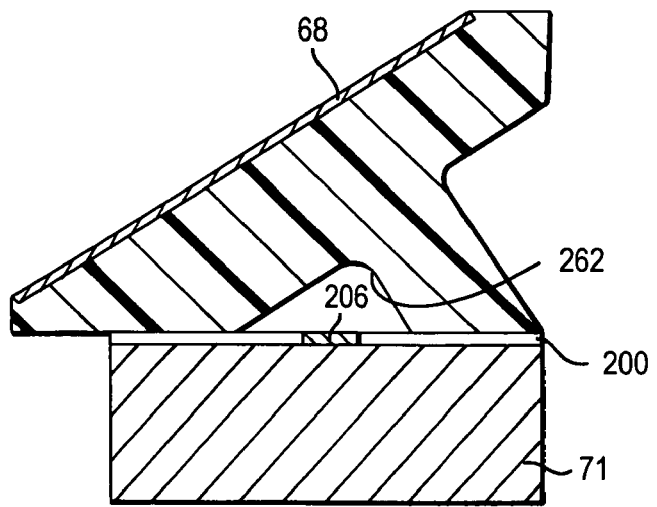
FIG. 10 is an enlarged sectional view taken on line 10-10 of FIG. 9.

The scan mirror 68, as seen in FIG. 10, has a T-shaped cross-section and is preferably an extruded piece of plastic or a drawn piece of glass on which a reflective mirror coating is coated. A long extrusion can be fabricated, and then polished, coated and cut for use in the drive.

It will be understood that each of the elements described above, or two or more together, also may find a useful application in other types of constructions differing from the types described above.

While the invention has been illustrated and described as embodied in a taut, torsional flexure and a compact drive for, and method of, scanning light using the flexure, especially for use in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A drive for scanning light, comprising:
   a support;
   a flexure on the support and having torsion portions extending along an axis, and first and second end portions spaced apart along the axis;
   a light-reflecting scan mirror on the flexure for joint movement therewith;

means for flexing the flexure in opposite circumferential directions about the axis for oscillating the scan mirror about the axis; and means integral with the flexure for tensioning the flexure by pulling the first and second end portions apart along the axis to a taut state in which the flexure is flexed.

2. The drive of claim 1, wherein the flexing means includes a permanent magnet on the flexure, and an electromagnetic coil on the support and operative for generating, in response to a periodic drive signal, a periodic electromagnetic field which interacts with a permanent magnetic field of the magnet to flex the flexure and oscillate the magnet and, in turn, the scan mirror.

3. The drive of claim 2, wherein the flexure has a support portion intermediate the torsion portions, and wherein the magnet and the scan mirror are mounted on the support portion.

4. The drive of claim 2, wherein the support has a recessed compartment across which the flexure spans, and wherein the magnet is at least partially received in the compartment.

5. The drive of claim 3, wherein the support portion extends along the axis for a predetermined distance, and wherein the scan mirror extends along the axis for a distance greater than said predetermined distance and at least partially overhangs the torsion portions.

6. The drive of claim 5, wherein the scan mirror has a rear portion mounted on the support portion of the flexure, and wherein the rear portion is recessed to provide mechanical clearance for the torsion portions to twist during the flexing of the flexure.

7. The drive of claim 1, wherein the first end portion is anchored to the support, and wherein the tensioning means is integral with the flexure at the second end portion thereof.

8. The drive of claim 7, wherein the support has at least one pin, and wherein the one end portion of the flexure has at least one cutout for positioning the at least one pin therein.

9. The drive of claim 7, wherein the support has a projection, and wherein the tensioning means includes a resilient flap integral with the second end portion of the flexure, and wherein the flap resiliently bears against the projection and pushes the end portions of the flexure away from one another in the taut state.

10. The drive of claim 9, wherein the flap has a curved shape in the taut state, and wherein the projection has a curved surface of complementary contour to the curved flap.

11. The drive of claim 9, wherein the flap has a free edge, and wherein the projection has a ridge for engaging the free edge.

12. The drive of claim 9, wherein the second end portion lies in a plane and frames a rectangular cutout, and wherein the flap has a rectangular shape corresponding to the rectangular cutout, and wherein the flap has a free edge elevated relative to the plane in the taut state and a hinged edge in the plane.

13. The drive of claim 1, and further comprising at least one vibration damper on the flexure and the support.

14. A tensionable, torsionable flexure for enabling oscillation of a scan mirror, comprising:

a support portion for supporting the scan mirror;

a pair of torsion portions extending along an axis; and a pair of end portions spaced apart along the axis, one of the end portions having an integral tensioning flap for tensioning the flexure by urging the end portions apart along the axis to a taut state in which the scan mirror is supported for oscillation.

15. The flexure of claim 14, wherein all the portions are together constituted of a single piece of resilient material.

16. The flexure of claim 14, wherein the one end portion has a generally planar frame bounding the flap, and wherein the flap has a curved shape in the taut state.

17. A method of scanning light, comprising the steps of:

mounting a light-reflecting scan mirror on a flexure having torsion portions extending along an axis, and first and second end portions spaced apart alone the axis;

flexing the flexure in opposite circumferential directions about the axis for oscillating the scan mirror about the axis; and self-tensioning the flexure by tensioning the flexure by pulling the first and second end portions apart along the axis to a taut state in which the flexure is flexed.

18. The method of claim 17, wherein the self-tensioning step is performed by forming a flap out of, and integral with, the second end portion of the flexure.

19. The method of claim 17, and the step of damping the flexure against vibrations.

20. The flexure of claim 17, wherein the flexing step is performed by mounting a permanent magnet on the flexure for joint oscillation with the scan mirror, and by applying a periodic drive signal to an electromagnetic coil for generating a periodic electromagnetic field that interacts with a permanent magnetic field of the magnet and causes the magnet and the scan mirror to oscillate about the axis.

* * * * *